No. 779,607. PATENTED JAN. 10, 1905.
K. KIEFER.
FILTERING APPARATUS FOR SEPARATING SOLIDS FROM LIQUIDS.
APPLICATION FILED APR. 29, 1901.

Witnesses.
Inventor.
Karl Kiefer

No. 779,607. PATENTED JAN. 10, 1905.
K. KIEFER.
FILTERING APPARATUS FOR SEPARATING SOLIDS FROM LIQUIDS.
APPLICATION FILED APR. 29, 1901.

Witnesses.

Inventor.
Karl Kiefer

No. 779,607. PATENTED JAN. 10, 1905.
K. KIEFER.
FILTERING APPARATUS FOR SEPARATING SOLIDS FROM LIQUIDS.
APPLICATION FILED APR. 29, 1901.

Patented January 10, 1905.

UNITED STATES PATENT OFFICE.

KARL KIEFER, OF CINCINNATI, OHIO.

FILTERING APPARATUS FOR SEPARATING SOLIDS FROM LIQUIDS.

SPECIFICATION forming part of Letters Patent No. 779,607, dated January 10, 1905.

Application filed April 29, 1901. Serial No. 57,970.

*To all whom it may concern:*

Be it known that I, KARL KIEFER, a citizen of the United States, residing at Cincinnati, Hamilton county, Ohio, have invented certain new and useful Improvements in Filtering Apparatus for Separating Solids from Liquids, of which the following is a specification.

My invention relates to that class of filters in which paper or similar pulp in a somewhat moist condition, but not dried paper fiber, is employed as the filtering medium.

The objects of my invention are to simplify the construction of such a filter, to reduce the expense of producing it, and to simplify its operation; and its novelty consists in the construction and adaptation of the parts.

In the drawings,
Fig. 11 is a vertical section in detail of a form of the screen or liquid-way modified from that shown in Fig. 10.
Fig. 12 is a similar view of yet another modification of this screen or liquid-way.
Fig. 18 is a similar section showing a peripheral inlet and a central outlet.

My filter is made up of a plurality of superimposed and congruent filter elements.

By the words "filter elements" I mean a unit consisting of one or more filter layers of paper-pulp or similar filtering media in connection with means for supplying the same with unfiltered liquid and draining it therefrom after filtration.

By the words "filter layer" I mean a flat plate or disk of compressed filter material having substantially plane surfaces on each side and capable of being supplied with unfiltered liquid on one side and drained from the other side.

The unfiltered liquid must be supplied to the filter elements and drained therefrom after filtration. In either case the liquid may be supplied directly to or exude directly from the compressed layer of pulp; but in no case can it be supplied to and be drained from the same filter element by such means only. There must be employed in addition fluid-ways. If the liquid is supplied directly, it must be drained through such a fluid-way, and if it is drained directly from the filter-layer it must be supplied through such a fluid-way. I also make it a point to separate each filter element from its neighbor and to support it independently of its neighbor. The supporting means may or may not form a part of the means for communicating with the inlet and outlet passages of the filter.

I will first describe some of the general features of my invention. In the first place, I desire to call attention to the fact that I use a single coarse wire-cloth as a means for supplying the unfiltered liquid to and drawing the clarified liquid from the filter elements.

In filters as heretofore made and known to me several constructions have been used to produce interstices or fluid-ways between two layers of semimoist and fibrous filter mass. Perforated metal sheets in combination with woven-wire fabrics have played an important part in producing such fluid-ways.

The use of a single woven fabric, however—such as, for instance, a coarse wire-cloth—has to my knowledge not heretofore obtained as a means of distributing liquid to a filtering medium consisting of plastic compressed pulp, such as paper-pulp freshly compressed, because it was thought that paper-pulp was plastic enough to fill out the interstices of the woven fabric. In the course of my investigation into this art I discovered that even when a single woven-wire cloth was used the filter mass of a certain consistency and moisture could not with the customary pressures employed be pressed so far between the interstices of the wire-cloth as to prevent the passage of liquid from one end of the cloth to the other or, in fact, as to prevent its passage in any direction within the cloth. In other words, the meshes of the cloth form capillary ducts which permit of the flow of the liquid.

I arrived, moreover, at another important result by using such capillary liquid-inlet ways. Heretofore when a filter was started it was necessary to "vent" it or to expel the air from within it by means of the entering liquid or by means of some special device provided for that specific purpose. For instance, many filters have been provided with gas-traps, vent-cocks, and the like or with means whereby the liquid entering at the bottom expelled the air from the filter at the top as it slowly rose therein. Such precautions are not necessary, however, when single-wire-cloth screens are employed as the liquid-ways. It is well known that air-bubbles are driven up or down in capillary ducts by a liquid flowing through such ducts. Under such conditions the consistency and cohesion of the liquid prevent air-bubbles from asserting their minor specific gravity in such a small space and they must be carried along with the stream of fluid and cannot collect or interfere with the filtering operation. I have utilized this principle and have constructed the fluid-ways throughout my filter, where they were necessary, in such a manner as to form these capillary ducts, and I have thereby gotten rid of the difficulty arising from the presence of air within the filter. At the same time I have secured the advantage by using coarse wire-cloth of the employment of a material which is cheap, light, and not readily gotten out of order.

Where I speak of "coarse" wire-cloth I mean a mesh of two and one-half to four openings to the inch, whereby the wire will have a thickness of from .080 to .125 of an inch. When I speak of "fine" wire-cloth, which I also call frequently "fiber-retaining" cloth, I mean having meshes from thirty to fifty to the inch and a wire of the thickness of .015 of an inch. This fine wire mesh is usually woven in a manner which is called "twilled." This manner admits of using very strong wire, still offering sufficient permeability to the water, and it is this kind of cloth which I preferably use in this filter and which has given the results as described. No difficulty arises from the use of such a single woven-wire cloth as an inlet liquid-way either when it is placed between two layers of compressed filter mass or between some other pliable substance and a layer of such filter mass. The fibers of the compressed layers do not singly protrude and do not tend to choke up the interstices in the woven-wire cloth. Moreover, the current of the incoming flowing liquid is away from the cloth and toward the filter layer on either one or both sides, and the tendency of its action is therefore further to compress the fiber. When, however, a single coarse-woven wire-cloth is to be used for the outlet liquid-way, a difficulty arises. As the outlet liquid-way is to be embedded between two filtering layers, the filter mass would have to be poured against the outlet wire-cloth in a thin state. In this condition the thin mixture would run through the meshes of the coarse wire-cloth. I therefore have to protect the coarse wire-cloth with a finer wire-cloth of the described dimensions. This fiber-retaining wire-cloth is not fiber-retaining in the absolute sense; but when the fiber is mixed in the consistency in which it is customary to use it in pulp-filters the fiber will settle so quickly upon the wire-cloth that there is no loss of the fiber, and this fine mesh of wire-cloth may be practically called "fiber-retaining." I also may use vegetable or animal fiber-retaining cloth—such as, for instance, wool flannel or felt. I also describe hereinafter in this specification sundry modified forms of these inlet and outlet fluid-ways, which will be made the subject of separate applications for patents.

In the practical construction of my filter I make the filter elements in pairs of layers. Each element is supported independently and separated from its neighbor by the screen which forms the inlet fluid-way, and the two layers of the pair are separated partly but not wholly by the screen which forms the outlet fluid-way. The screens and filter elements are supported either by central or peripheral means, which constitute also the means of communication between the fluid-ways and the inlet and outlet passages of the filter.

It will be understood, of course, that while a single filter element might be employed, yet in practice my filter is made up of a plurality of such elements assembled in a suitable framework, with inlet and outlet passages common to all of the elements and with means for supporting and keeping the elements in place.

In the course of this specification I shall describe a number of modifications of certain of the mechanical devices employed. This is to insure completeness of understanding of the scope of the invention; but wherever such modifications constitute separate and distinct species of generic forms they will become the subject-matter of separate applications for Letters Patent.

Figure 1:
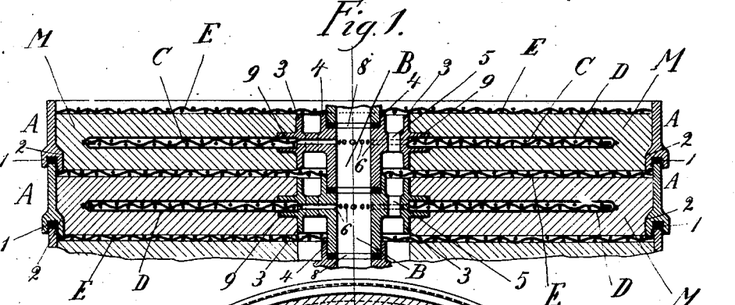
Figure 1 is a central vertical section of a preferred form of my filtering elements and their adjacent parts when assembled.
Figure 2:
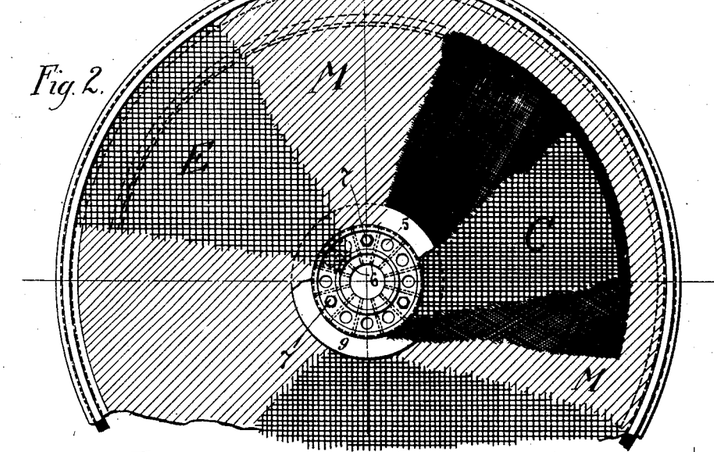
Fig. 2 is a top plan view of the same, showing parts cut away to show concealed parts.
Figure 7:
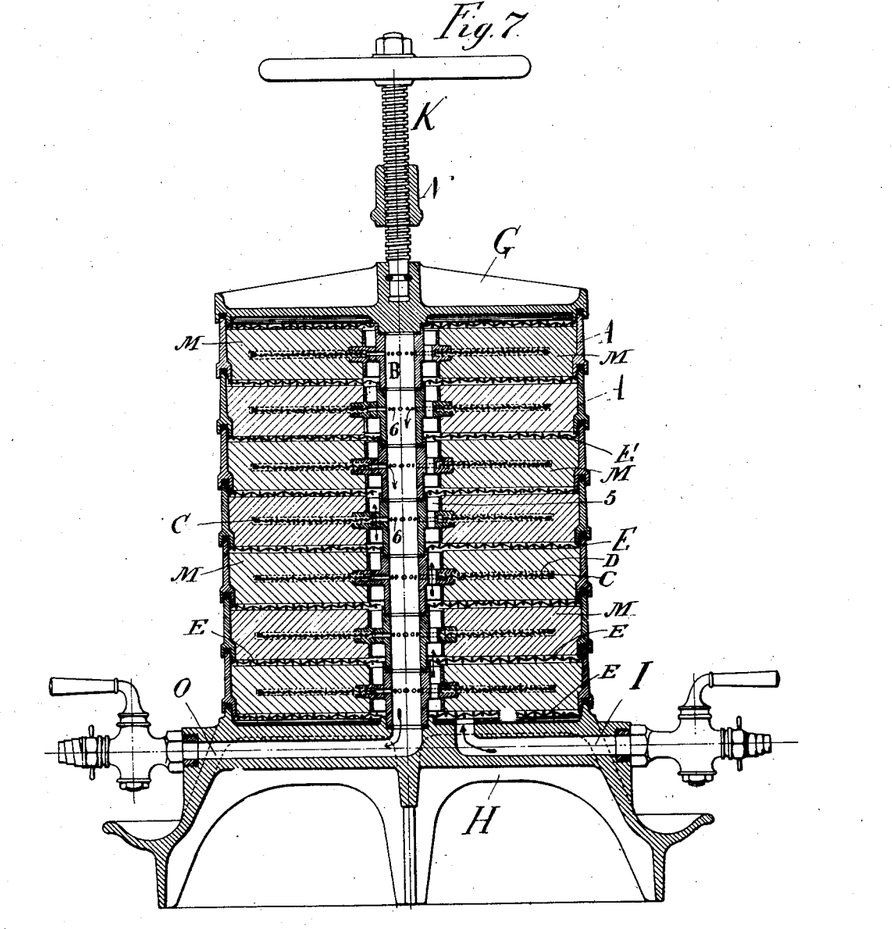
Fig. 7 is a central vertical section of a complete filter, showing some of the adjacent parts in elevation.

Referring to the drawings, I have illustrated a preferred form of my improved filter in Figs. 1 and 2 and with some slight modifications in Fig. 7. In Figs. 1 and 2 are shown two filter elements arranged in juxtaposition, in Fig. 7 is illustrated the method of assembling the elements in a completed filter, and in Fig. 8 the method of securing them in place after assemblage.

Each filter element consists of a body of compressed pulp M, composed of an upper and lower circular layer partly but not wholly separated from each other by means of two fine-wire or cloth circular screens D, between which is a coarse-wire-cloth screen C. Where they are not so separated, these two layers have their fibers interlaced in an annular area of contact beyond the circumference of the screen C. The filter mass M is encircled by a ring A, made of metal or any suitable material and forked at the bottom to form a groove in which is inserted a gasket 1. These grooves serve also to maintain the alinement of the superimposed rings, which together form an encircling shell for the filter elements.

Each filter element is separated from its neighbor by a single circular coarse-woven-wire screen E, having a central circular aperture to admit of the passage of a hub B. These hubs are arranged in a series one above the other and one for each filter element. Each hub has a wide central opening and is bored with radial holes 6, adapted to communicate with the screens C and D when the parts are assembled. It is also provided with a series of holes 5 parallel with its axis and which communicate with the screens E and with each other. These last-mentioned holes 5, taken all together, form an inlet-channel, and the central apertures of the hub, taken all together, form the outlet-channel, of the filter. In Fig. 1 the screen E is shown as if it separated the holes 5 in relation to each other. It does not, however, constitute an obstacle to the passage of the liquid which flows through its meshes. Each hub is provided with projecting flanges 9, adapted to receive between them the screens C and D. The screens E, which have a smaller central aperture than the screens C and D, fit closely around the dependent flanges of each hub and between parallel projecting members 3 and 4 on each hub and corresponding downwardly-projecting members on the hub above it. Beneath the lowermost rim of each hub is secured a gasket 8. This gasket cannot, however, become unduly compressed, as the members 3 and 4 are made of such a size that they will touch the corresponding members of the adjacent hub before destructive compression of the gasket can occur. Each hub may be made in two pieces, divided on the plane of the horizontal medial line of the screen C. If so, the parts are secured together by screws 7.

The filter layers are formed outside of the filter in a suitable mold or former such as known in the art—for instance, a device similar as used in connection with my former invention, No. 579,586, or as is used in patent specification No. 634,947. First, the lower layer is formed, using as a base an auxiliary fine-mesh screen. Then the screens C and D are inserted, and then the upper layer is formed. The pulp of the upper layer being wet when it is brought into contact with that of the lower layer beyond the circumference of the screens C and D, the fibers of these two layers are caused to be interlaced in the annular area of contact above referred to. The inwardly-projecting portion 2 of the ring A, which forms one wall of the gasket-groove of such ring, serves as a support for the filter mass M to prevent it from slipping downward. In order to transport the finished filter element from the packing apparatus to the filter proper, it is carried between two coarse screens E, which are clasped together with both hands. The exchange from the auxiliary screen of the packing apparatus to the separating-screen E is effected by reversing the filter elements, whereupon the substitution can take place. It will be noticed also that the screens E being rigidly held at their centers between two hubs serve to support the filter element arranged above them in each case independently of any support afforded by the flange 2 of the ring A or otherwise. It will also be noticed that the hubs being of a certain thickness protrude into the filter mass more than the rest of the wire-cloth, which causes a greater compression in the neighborhood of these hubs than at the rest of the filter layer.

The outer surfaces of the hub B are made smooth and without rough or projecting parts, so that the compressed pulp tends to cling to them closely. There is thus avoided any tendency for the unfiltered liquid to creep along the line of junction between the pulp and the metal.

In Fig. 7 is illustrated the method of assembling the filter elements. The hubs B are mounted one above the other, exact centering being secured by the engagement of their dependent members. The alinement of the parts is further assisted by the engagement of the dependent flanges of the inclosing rings A. All of the screens E are connected with the holes 5, which form the vertical inlet-channel of the filter, and all of the screens C are connected with the radial holes 6 and through them with the centers of the hubs, which together form the vertical outlet-channel of the filter. The filter elements are assembled above a base H, made of cast metal or other suitable material and provided with a valve-controlled inlet-passage I, communicating with the lowermost screen C, and also provided with a valve-controlled outlet-passage O, communicating with the central aperture of the lowermost hub. The whole device is closed by a cover G, provided with a gasket or other suitable means for making a tight joint.

Figure 8:
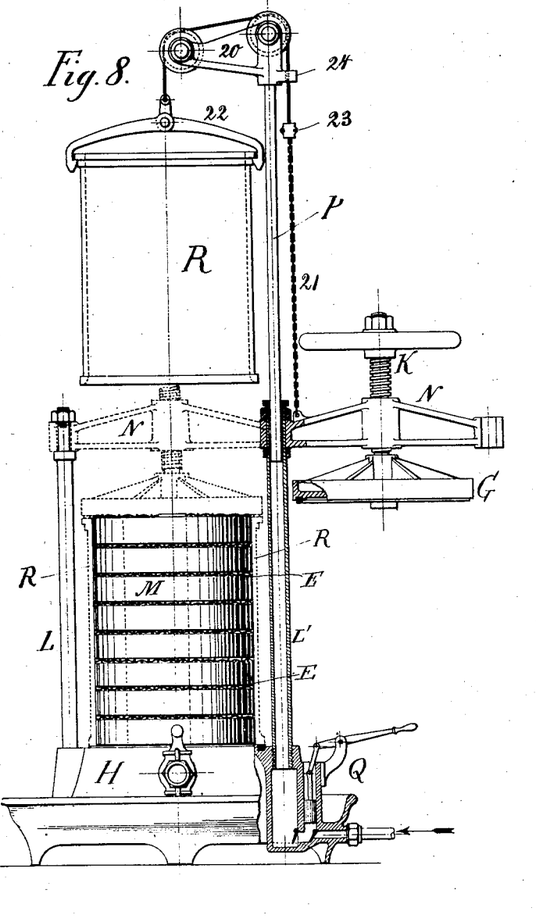
Fig. 8 is a side elevation of a modified form of the filter provided with an incasing drum and means for handling the same, some of the parts being shown in dotted outline in different positions from those indicated by the full lines and the inlet-passage and connections being shown in vertical section.

In Fig. 8 is illustrated the means employed for tightening the filter. Two upright posts L and L' are secured to the base H. On one of them, L', and adapted to swing on a hinge or pintle is secured a yoke N, provided with a centrally-threaded aperture adapted to engage with a vertical screw K, to which is secured at its upper end a hand-wheel and at its lower end a cover G. After the yoke has been swung so as to bring the cover G in position above the filter elements the hand-wheel is turned until the cover is forced down on the uppermost ring A and fits tightly. In this figure is also shown some other devices useful when the filter is provided with an external drum or cover and which will be hereinafter described.

The operation of the filter constructed as above described is as follows: The turbid liquid is let into the inlet-passage I under suitable pressure. Thence it flows to the lowermost screen E and through the holes 5 5 and the different inlet liquid-ways or screens E until it reaches all of the filter layers M. Forced by the pressure back of it, it permeates and penetrates the filter layers until it reaches the protecting-screens D. It then passes through these screens to the outlet fluid-ways formed by the screens C and thence through the holes 6 6 to the central apertures of the hubs and the outlet-passage O. As before stated, the screens C C may be used as outlet liquid-ways without the protecting-screens D D; but the use of the latter is desirable to prevent the escape of the fibers into the clarified liquid.

It will be observed that the layers of pulp are forced by the pressure upon the column of incoming liquid against the hubs B and the rings A and that the greater the pressure the tighter the filter mass is compressed—a result heretofore much desired, but not obtained in any form of filter known to me. For this purpose the width of the flange 9 of the hub should be as wide as the thickness of the filtering layer in contact with it. If it would be less, then the liquid could enter from the vertical part of the filter layer next to the ring 3, Fig. 1, and enter the filter mass, counteracting the hydraulic pressure against its surface. The width of the surface 9 therefore should be preferably more than the thickness of the filter layer in contact therewith.

In Figs. 3, 4, 5, 6, 9, 10, 11, and 12 are illustrated certain modified forms of the fluid-ways of the filter mass.

Figures 3, 4, 5, 6:
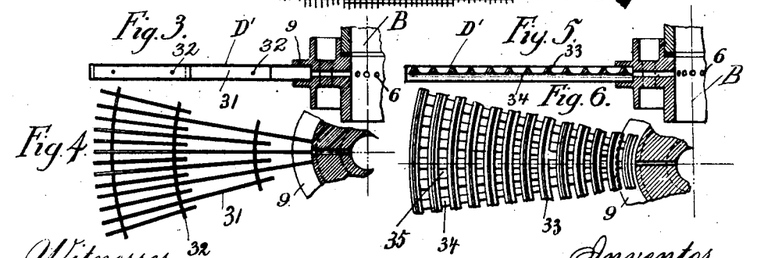
Fig. 3 is a vertical section in detail of a modified form of one of my screens or liquid-ways.
Fig. 4 is a plan view thereof.
Fig. 5 is a vertical section in detail of yet another modified form of one of my screens or liquid-ways.
Fig. 6 is a plan view thereof.

In Figs. 3 and 4 flat bars 31 of different lengths are radially arranged to form a circular cribwork, cross-wires 32 serving to connect the bars 31 where necessary to keep them in position. The longest bars extend inward and are placed between the flanges 9 of the hub B. It will be seen that to a certain extent this cribwork performs the same function as the screens C—that is, it supports the filter mass and forms an outlet liquid-way for the clarified liquid; but it is not a capillary way. In order to make it more efficient and to prevent the escape of the fibers of the filter mass into the clarified liquid, a circular sheet of flannel D is placed on each side of the crib.

In Figs. 5 and 6 is shown another modification of the means provided for the outlet fluid-way. The supporting-screen in this case is made of an open-work circular plate of metal or other suitable material engaging with the flanges 9 of the hub B and provided with radial members 34 on its lower side and circular concentric members 33 on its upper side. This plate is likewise provided with protecting layers of flannel D, placed on each side thereof.

Figure 9:
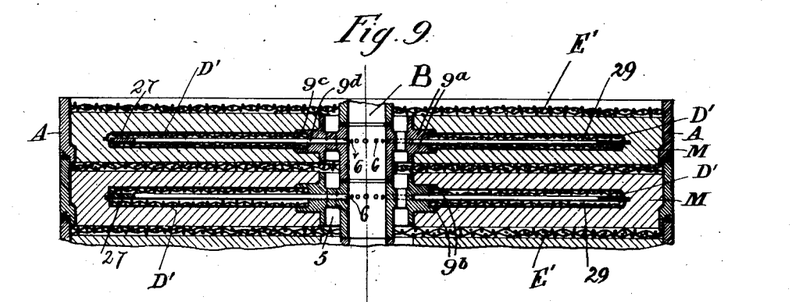
Fig. 9 is a central vertical section of a modified form of two filtering elements and their connections.
Figure 10:
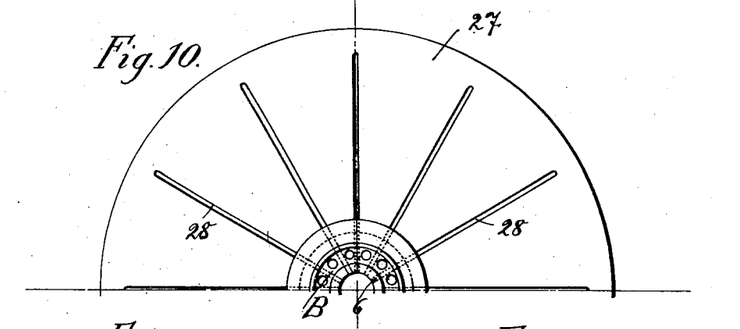
Fig. 10 is a plan view of the metal sheet 27 shown in section in Fig. 9, illustrating its connection with the hub B.

In Figs. 9 and 10 are illustrated further modified forms employed for the inlet and outlet liquid-ways of the filter element. The inlet-way is made of a screen of wire-cloth E', similar to the cloth E previously described, but made of a double fabric, as shown in section in Fig. 9. The outlet-way, as formerly described, is also modified. It is here shown constructed of a circular sheet of metal 27, provided with radial slots 28, which do not, however, extend to its periphery. This sheet 27 fits snugly between flanges $9^a$ of the hub B, which are for that purpose placed closer together than the flanges 9 in the construction shown in Fig. 1. The slots 28 communicate with the radial holes 6 of the hub B. On each side of the sheet 27 is arranged a fine wire-cloth screen 29. Intermediate the screens 29 and the filter layers are arranged flannel sheets D', as heretofore. The screens 29 and the flannel sheets D' are at their inner edges engaged by lips $9^b$, formed on the flanges $9^a$ of the hub B. In this construction the flannel serves as a protecting-sheet to prevent the escape of the fibers. The screens 29 serve as capillary outlet liquid-ways and the radial slots 28 of the plate 27 as an outlet channel additional to that afforded by holes 6.

Figures 11, 12:
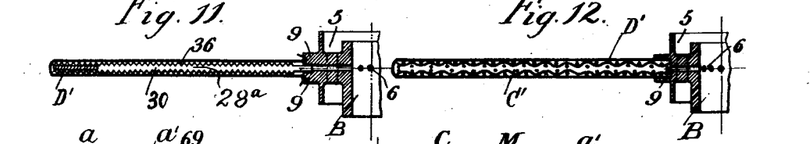

In Fig. 11 a further modified form of the outlet liquid-way is shown in section. In this construction the intermediate fine wire-cloth screens 29 (shown in Fig. 10) are dispensed with entirely. A circular plate 30, provided with radial slots 28ª, similar to those shown at 28 in Fig. 10, is grooved with concentric circular thread-like corrugations 36 on each side. These form capillary channels similar to the interstices of the woven-wire cloth C, heretofore described. They communicate, of course, with the slots 28ª, which they intersect. Intermediate protecting-screens D', of flannel, are placed between the plate 30 and the filter layers, and the whole engages with the flanges 9 on the hub B. This construction forms a rather stiff and rigid outlet-way, but is useful under some circumstances where dense liquids are to be filtered under great pressure.

In Fig. 12 is illustrated yet another modification of this part of the apparatus. In this form of construction the screen C' is formed of double woven-wire cloth of relatively wide mesh and is protected by flannel screens D' and engages with the flanges 9 of the hub B, as heretofore described.

These modifications of the liquid-ways of the filter elements will be made the subject of applications for additional Letters Patent.

Figure 14:
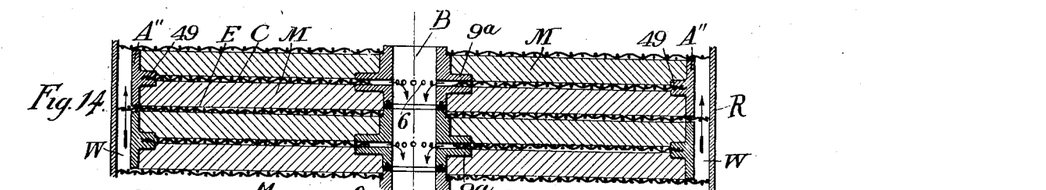
Fig. 14 is a vertical section of the filtering elements, showing a peripheral inlet and a central outlet.
Figure 15:
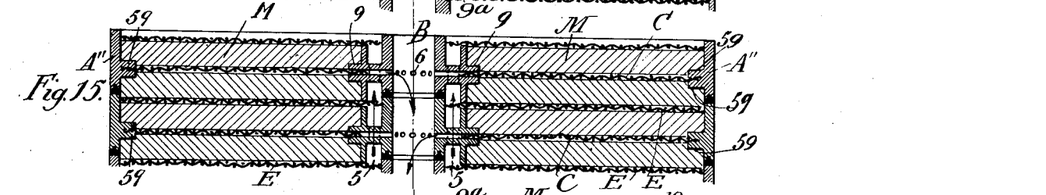
Fig. 15 is a similar section showing a central inlet and outlet.

In Figs. 9, 11, 14, 15, 16, and 18 are shown certain modified forms of the central hub B. In Fig. 9 the flange 9 is provided with a shallow circular groove 9ᶜ to admit of the reception of the fine wire-cloth screens 29 and the protecting flannel sheets D' and with a deep circular groove 9ᵈ to admit of the reception of the plate 27. In Fig. 11 a similar doubly-grooved flange is also shown with the shallow groove not quite so deep as that shown in Fig. 9. In Fig. 15 the filter elements are shown in combination with a modified form of the ring A'', in which it is provided with an inwardly-extending flange 59, grooved to admit of the reception of the plates C. I am therefore able to make the flange 9 of the hub smaller, because not so much strength is needed to support the filter element when the screen C is supported at its periphery as well as at its center.

In all of the constructions above referred to and shown in Figs. 9, 11, and 15 the central hub has been provided, as shown in Fig. 1, with the inlet-holes 5 5 and the radial holes 6, so that the filter elements provided with hubs of this construction have had both their inlet and outlet channels at the center of the filter.

Figure 16:
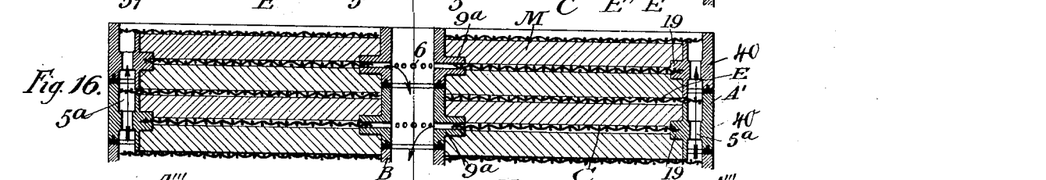
Fig. 16 is a similar section showing a peripheral inlet and a central outlet.
Figure 18:
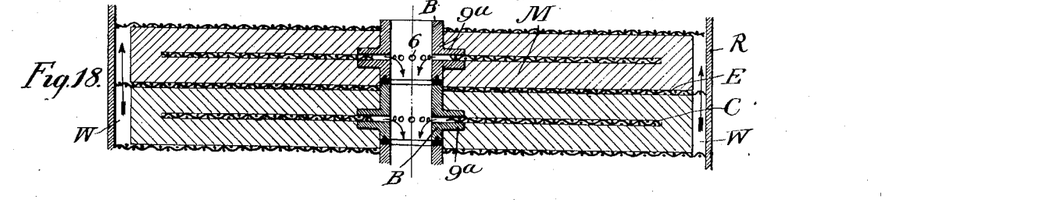

In Figs. 14, 16, and 18 I show a modification of the central hub, which consists in doing away with the holes 5, bored parallel to the axis of the hubs, leaving the flange 9ª to support the screens C, constituting the outlet liquid-way, in the same manner as before, but providing no communication between the screens E, constituting the inlet liquid-way. On the contrary, in the construction shown in these Figs. 14, 16, and 18 the ring A encircling the filter elements is either dispensed with entirely, as shown in Fig. 18, or is reduced to the form A' shown in Fig. 16, in which it is provided with holes 5ª, like the holes 5 with which the hub B was formerly provided and which together constitute a peripheral inlet-channel to the screens E, a flange 19, suitably grooved, being provided to properly support the drainage-screens C and their protecting-sheets, if any, or the rings A are reduced to a yet simpler form, as shown in Fig. 14, where it consists of a vertically-placed annulus A', provided with an inwardly-projecting flange 49, the screen E being interposed between each pair of rings and an inlet-channel W being formed between the outside surfaces of the rings and an encircling drum R.

These modifications of the central hub will be made the subject of applications for additional Letters Patent.

In Figs. 9, 13, 14, 15, 16, 17, 18, 19, 20, 21, 22, 23, and 24 are illustrated certain modified forms of the ring A encircling the filter elements. In Fig. 1 this ring is shown as consisting of a vertically-placed annulus forked at its bottom edge and provided with a groove adapted to receive the gasket 1 and with an inwardly-projecting member 2, adapted to prevent the filter mass from slipping downward.

In Fig. 9 is shown a slight modification of the construction illustrated in Fig. 1 in that the external walls of the rings are made smooth and together constitute a practically unbroken cylindrical surface.

In Fig. 18 the rings are shown all united together and consolidated into one external drum or cylinder R.

In Fig. 15 the ring is shown as a single vertically-placed annulus A², with an inwardly-projecting grooved flange 59, adapted to receive a screen, as C, all the rings together constituting a cylinder with an externally smooth surface.

In Fig. 14 substantially the same construction of the ring is shown as in Fig. 15 except that the top and bottom edges of the rings A' do not touch each other, but are separated to admit of the passage of the screens E E, which screens communicate under such circumstances with an annular space between the external surfaces of the rings and an inclosing drum R, surrounding all of the filter elements and placed a slight distance therefrom.

Figure 17:
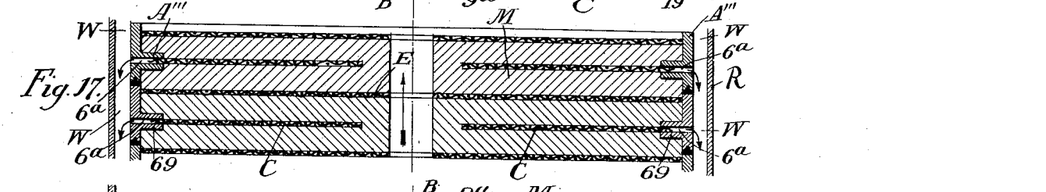
Fig. 17 is a similar section showing a central inlet and peripheral outlet.

In Fig. 17 is shown a modified form of the ring A''', in which it is provided with an inwardly-extending flange 69, which is not only grooved to admit of the reception of a screen, as C, but also is provided with holes 6ª, radially drilled to afford communication between the screens C and the annular passage formed between the outer surface of the rings and an externally-placed drum R.

Figure 20:
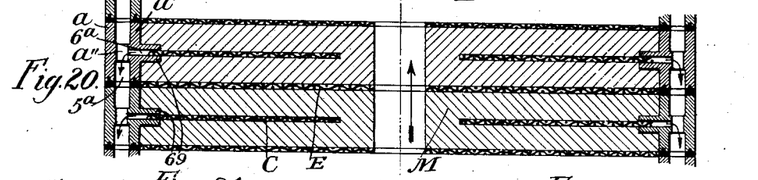
Fig. 20 is a similar section showing a central inlet and peripheral outlet.

In Fig. 20 is shown a construction in which each ring is provided with an outer vertical member $a$, an inner vertical member $a'$, with an annular space between them except at annular area of contact $a^2$, provided in turn with vertical holes $5^a$, adapted to communicate with radial holes $6^a$, which in turn communicate with the grooves of inwardly-extending flanges 69, adapted to receive and support screens C. In this form of construction the screens, radial holes $6^a$, vertical holes $5^a$, and the annular passage between the outer and inner members of the ring constitute the outlet liquid-way and the discharge-channel of the filter elements.

Figure 19:
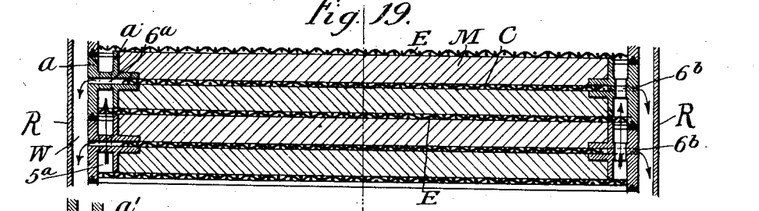
Fig. 19 is a similar section showing a peripheral inlet and outlet.

In Fig. 19 is shown essentially the same construction of the ring A as that just described as shown in Fig. 20; but it is combined with the external drum R, affording an additional annular passage W outside of the external surface of the rings. In this construction shown in Fig. 19 the radial holes $6^b$, communicating with the grooves of the inwardly-extending flanges 69, are drilled all the way through both members of the ring to afford a communication between the screen C, supported in the flange, and the annular passage between the outer surface of the rings and the external drum R. Of course it will be understood that there is no communication between the vertical holes in the rings and the radial holes, the vertical holes communicating in this case with the screens E, which form the inlet liquid-ways of the filter and the radial holes communicating with the screens C, which form the outlet liquid-ways of the filter.

Figure 13:
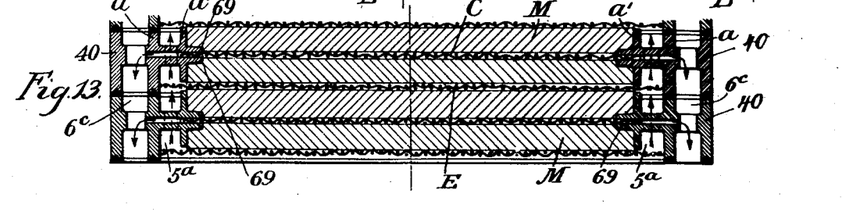
Fig. 13 is a vertical section of the filtering elements, showing a peripheral inlet and outlet.

Substantially the same construction as that shown in Fig. 19 is shown in Fig. 13, only in this case a third set of members 40 are employed to take the place of the drum R in Fig. 19, the radial holes of the inwardly-extending flanges of the rings communicating, as in the construction shown in Fig. 20, with the vertical holes $6^c$, formed between the two outer sets of members of the rings. In this construction, as well as in that shown in Fig. 19, the inlet and outlet channels of the filter are peripheral, the filter elements extending all the way across the filter and having no center apertures.

Figure 21:
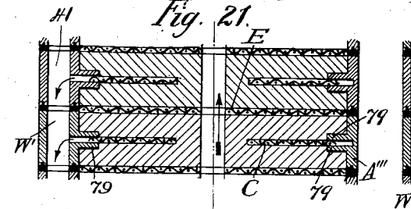
Fig. 21 is a similar section showing a central inlet and peripheral outlet, the latter communicating with a single discharge-channel.
Figure 22:
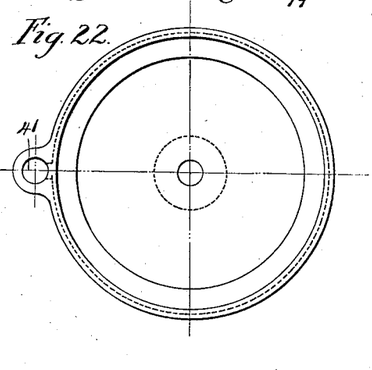
Fig. 22 is a plan view of the same.

In Figs. 21 and 22 is shown another modified form of the ring in which it consists of a vertically-placed annulus $A'''$, provided with an inwardly-extending grooved flange 79, adapted to support a screen C, but in which it is provided at one point in its circumference with an apertured ear 41, so that a series of these ears superimposed above each other constitute a channel W', which, if the filter be fed from a central aperture, is used as an outlet or discharge passage for all of the filter elements.

Figure 23:
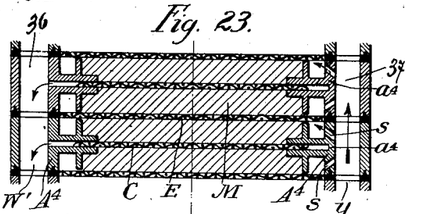
Fig. 23 is a vertical section of the filtering elements, showing a peripheral inlet and outlet, each of the inlets and outlets communicating with single inlet and discharge channels.
Figure 24:
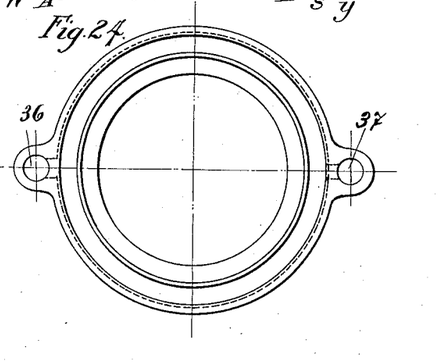
Fig. 24 is a plan view of the same.

In Figs. 23 and 24 is shown a modification of the construction illustrated in Figs. 21 and 22. In this construction the ring $A^4$ is provided with two sets of ears 36 and 37, suitably apertured, the set 37 constituting an inlet-channel and the set 36 an outlet-channel for the filter elements when assembled. In this construction the walls of the intermediate vertical member of the ring are apertured at different points, as S S, to afford a communication between the inlet-channel formed by the ears 37 and the screens E, constituting the inlet fluid-ways of the filter.

These modifications of the encircling rings of the filter elements will be made the subject of applications for additional Letters Patent.

The sundry modifications of the central hub B and encircling ring A enable me to make many desirable combinations of the filter elements and their inlet and outlet liquid-ways. These combinations are illustrated in Figs. 13 to 24, and as the constructions of the hubs and rings as modified have already been referred to in detail reference will not again be made to them; but the different combinations will simply be pointed out. The arrows indicate on each figure the course of the liquid, it being understood that in each instance the turbid liquid flows upward and the clarified liquid downward, although, as I have heretofore explained, the currents may be reversed.

In Fig. 13 the inlet and outlet channels are peripheral and the central hub is omitted.

In Fig. 14 the inlet-channel is peripheral and the outlet-channel central.

In Fig. 15 the inlet and outlet channels are both central.

In Fig. 16 the inlet-channel is peripheral and the outlet-channel central.

In Fig. 17 the inlet-channel is central and the outlet-channel peripheral. In this construction the hub B is entirely dispensed with, the central apertures in the filter elements forming together a central vertical passage for the incoming liquid, crossed at intervals by the screens E.

In Fig. 18 the inlet is peripheral and the outlet central. In this construction the rings are entirely dispensed with, the space between the external surfaces of the filter elements and the interior of the encircling drum R constituting a vertical annular passage for the incoming turbid liquid which permeates and penetrates the filter mass directly on the edges of the filter layers and is fed, as has been heretofore described, through the inlet liquid-ways formed by the screens E, also.

In Fig. 19 the inlet and outlet channels are peripheral.

In Fig. 20 the inlet-channel is central and the outlet-channel peripheral, the hubs being omitted in this case, as in the construction shown in Fig. 17.

In Figs. 21 and 22 the inlet is central, but the outlet is contracted into a tubular intercommunicating liquid-way 41, as previously described.

In Figs. 23 and 24 the inlet is peripheral, but is contracted to a single vertical tube, and the outlet is likewise peripheral, but contracted to a similar vertical tube, as already described.

These different combinations of the several filter elements with their different inlet and outlet channels will form the subject-matter of separate applications for Letters Patent.

In Fig. 8 I have illustrated a method of handling some of the parts of the filter, which I shall now describe. In the form of filter shown in the figure the combination shown in section in Fig. 18 has been employed for the filter elements. The screens E therefore extend to the outer edge of the cylindrical body formed by the different filter elements. The drum R, which has been formed virtually by the consolidation of the different vertical rings A into one piece, is adapted to encircle and surround the filter elements when assembled. With this construction the problem to be solved was to make the application of a drum of this kind possible while not obstructing access to all of the parts while assembling them. In this case one of the uprights L', previously referred to, is made hollow and forms a cylinder for a long piston P. A hydraulic pump Q of usual construction serves for raising the piston. A chain 21 is fastened at one end to the yoke N and at the other end carries a fork 22, adapted to clutch or engage with the upper part of the drum R. The hydraulic piston carries at its upper end a bracket 20, supporting two pulleys over which the chain 21 is adapted to pass. A stop-lug 23, fastened upon the chain, is adapted to engage with a rearwardly-projecting member 24 of the bracket 20, and thus limit its upward movement. If the chain 21 were not provided with the stop-lug 23, it is obvious that as the pulleys upon the bracket 20 serve as double-armed levers the rate of upward travel of the fork 22, and consequently of the drum R, would be twice as great as that of the piston P. If, on the other hand, the chain 21 were secured to the bracket 20 without passing over the pulleys carried by it, the upward travel of the fork 22 and the drum R would be equal to that of the piston P. In the construction shown there is a combination of both of these operations. If the piston P travels downward until the lug 23 meets the projecting member 24, the drum R has traveled down twice as fast as the piston up to that moment. From that time the drum is, in effect, rigidly connected with the piston P and bracket 20, and it therefore moves with the same speed as the piston. By the arrangement described, although the piston P cannot be made any longer than the column L', the drum R can be lifted clear above the column.

What I claim is—

1. In a filter, the combination of two disk-shaped filtering layers of compressed fibrous pulp, of liquid-ways interposed between said filter layers and draining or supplying them, and consisting only of wire screening where in contact with the effective part of the filter layers, with means for supplying the inlet-ways with unfiltered liquid and draining the outlet liquid-ways from clear liquid.

2. In a filter, the combination of two fibrous filtering layers, of liquid-ways interposed between said filter layers, and consisting only of wire screening where in contact with the effective part of said filter layers, with means for their supply with unfiltered liquid.

3. In a filter, the combination with a plurality of circular filter elements, each consisting of two flat filtering layers of fibrous material, interlaced with each other at their periphery, so as to prevent the unfiltered liquid from entering between said layers, and connected at their centers by means of non-porous material, affording a continuous communicating passage for all the filter elements, in combination with liquid-ways for draining off the filtered liquid and means for supplying the filter elements with unfiltered liquid.

4. In a filter, the combination of two fibrous filter layers, of inlet liquid-ways, each consisting of single-woven wire screens, where located between the effective parts of said filter layers, with means for supplying the inlet-ways with unfiltered liquid and conducting the filtered liquid from the filter layers.

5. In a filter, outlet liquid-ways, consisting of single coarse-woven screens in combination with a finer protecting woven screen in contact therewith, arranged parallel and in contact with two filter layers drained thereby, and means for supplying unfiltered liquid to the filter layers and for carrying off the clarified liquid from the outlet liquid-way.

6. In a filter, a plurality of filter elements, each consisting of two layers of compressed pulp, the fibers of said two layers being interlaced in an area of contact and separated except at such area by wire-cloth forming a liquid-way, and means of supplying the filter elements with unfiltered liquid.

7. In a filter, a plurality of filter elements, each consisting of two layers of compressed pulp, the fibers of said two layers touching each other in an area of contact and separated except at such area by woven cloth forming a liquid-way, and means of supplying the filter elements with unfiltered liquid.

8. In a filter, a plurality of filter elements, each consisting of two layers of compressed pulp, the fibers of said two layers being interlaced in an area of contact and separated except at such area by woven cloth, forming an outlet liquid-way, and of a finer protecting woven cloth interposed between the coarse wire-cloth and the layers of compressed pulp, adapted to prevent the escape of the fibers of the pulp therefrom, and of means for supplying the filter elements with unfiltered liquid and conducting the filtered liquid from the outlet liquid-way.

9. In a filter, a plurality of filter elements, each consisting of two layers of compressed pulp, the fibers of said two layers touching each other in an area of contact and separated except at such area by a single coarse wire-cloth, forming an outlet liquid-way, and of a finer protecting woven cloth interposed between the coarse wire-cloth and the layers of compressed pulp, adapted to prevent the escape of the fibers of the pulp therefrom, of means for supplying the filter elements with unfiltered liquid and conducting the filtered liquid from the outlet liquid-way.

10. In a filter, the combination with a plurality of filter elements, each composed of two layers of compressed pulp, the fibers of the same being interlaced in an annular area of contact but not interlaced with the layers of the neighboring filter elements, of means for separating the neighboring elements consisting of a single wire-cloth adapted to form a liquid-way for the supply of the liquid, with means for supplying the inlet liquid-ways with unfiltered liquid and conducting the filtered liquid from the outlet liquid-ways.

11. In a filter, the combination with a plurality of filter elements, each composed of two layers of compressed pulp, the fibers of the same touching each other in an annular area of contact, but not touching the fibers of the layers of the neighboring filter elements, of means for separating the neighboring elements, consisting of woven cloth adapted to form a liquid-way for the supply of the liquid, with means for supplying the inlet liquid-ways with unfiltered liquid and conducting the filtered liquid from the outlet liquid-ways.

12. In a filter, a base, a plurality of filter elements, each consisting of two layers of compressed pulp, and being interlaced in an annular area of contact, liquid-conductors adapted to separate the layers of the neighboring filter elements, non-porous means for supporting the filter elements rigidly with reference to the base, in combination with means for supplying the inlet liquid-ways with unfiltered liquid and conducting the filtered liquid from the outlet liquid-ways.

13. In a filter, a base, a plurality of filter elements, each consisting of two layers of compressed pulp, and touching each other in an annular area of contact, liquid-conductors adapted to separate the filter layers of neighboring filter elements, non-porous means for supporting the filter elements rigidly with reference to the base, in combination with means for supplying the inlet liquid-ways with unfiltered liquid and conducting the filtered liquid from the outlet liquid-ways.

14. In a filter, the combination with a plurality of filter elements, each consisting of a filtering medium embedded in which is a circular disk-shaped liquid-conductor for the draining of the clear liquid, consisting of wire screen, and of means for supplying the filter elements with unfiltered liquid.

15. In a filter, a liquid-conductor in contact with two filter layers, said liquid-conductor having concentrical and ring-shaped flanges, increasing at their places of connection the thickness of the liquid-conductor and adapted to more compress the fibers of the filtering layers than the rest of the liquid-conductors, with the means for supplying the inlet liquid-conductors with unfiltered liquid and conducting the filtered liquid from the outlet liquid-conductors.

16. In a filter, a circular woven liquid-conductor in contact with two filter layers, said liquid-conductor having concentrical and ring-shaped flanges, increasing at their places of connection the thickness of the liquid-conductor, and adapted to more compress the fibers of the filtering layers than the rest of the liquid-conductors.

17. In combination with a disk-shaped filter layer, a liquid-conductor for clear liquid, having contact-surfaces arranged parallel to the filtering layer and projecting more into the latter than the rest of said liquid-conductor, for the purpose of excluding the cloudy liquid from entering said clear-liquid conduit, with means for supplying the filtering layer with cloudy liquid.

18. In a filter, the combination with disk-shaped filtering layers, a liquid-conductor in contact with two filtering layers, said liquid-conductor having contact-surfaces protruding into said filter layers more than the rest of said liquid-conductor for the purpose of preventing the passage of cloudy liquid from entering the clear side of the filtering layers.

19. In a filter, a liquid-conductor in contact with two filter layers of compressed fibrous pulp, said liquid-conductor having concentrical and ring-shaped flanges, increasing at their places of connection the thickness of the liquid-conductor and adapted to more compress the fibers of the filtering layers than the rest of the liquid-conductors, with means for supplying the inlet liquid-conductors with unfiltered liquid and conducting the filtered liquid from the outlet liquid-conductors.

20. In a filter, the combination of two filtering layers of compressed fibrous pulp, of liquid-ways, draining or supplying said filter layers, consisting of single woven screens, where located between the effective part of said layers, with means for supplying the inlet liquid-ways with unfiltered liquid and conducting the filtered liquid from the outlet liquid-ways.

21. In a filter, liquid-ways each consisting of single coarsely-woven screens parallel to and in contact with finer protecting woven screens, each of the finer screens in contact with a filter layer, and means for supplying the inlet liquid-ways with unfiltered liquid and conducting the filtered liquid from the outlet liquid-ways.

22. In a filter, the combination with a plurality of filter elements, each composed of two layers of compressed pulp, the fibers of the same being interlaced in an annular area of contact, but not interlaced with the layers of neighboring filter elements, of liquid-conductors adapted to separate the neighboring filter elements, and of means of supporting the filter elements, consisting of a liquid-conductor connected to a concentrical hub with openings for the supply or discharge of the liquid passing through the filter, and of means for supplying the inlet liquid-ways with unfiltered liquid and conducting the filtered liquid from the outlet liquid-ways.

23. In a filter, the combination with a plurality of filter elements, each composed of two layers of compressed pulp, the fibers of the same touching each other in an annular area of contact, but not touching the layers of neighboring elements, of liquid-conductors adapted to separate the neighboring filter elements, and of means for supporting the filter elements, consisting of a liquid-conductor connected to a concentrical hub with openings for the supply or discharge of the liquid passing through the filter, of means for supplying the inlet liquid-ways with unfiltered liquid and conducting the filtered liquid from the outlet liquid-ways.

24. In a filter, filter elements consisting of two filter layers of compressed pulp, the fibers of which are interlaced in an annular area of contact, but not interlaced with the layers of the neighboring elements, of means for supplying the filter elements with unfiltered liquid and conducting the filtered liquid therefrom.

25. In a filter, filter elements consisting of two filter layers of compressed pulp, the fibers of which are interlaced in an annular area of contact at their periphery, but not interlaced with the layers of the neighboring elements, of means for supplying the filter elements with unfiltered liquid and conducting the filtered liquid therefrom.

26. In a filter, filter elements consisting of two filter layers of compressed pulp, the fibers of which touch each other in an annular area of contact, but not touching the layers of the neighboring filtering elements, of means for supplying the filter elements with unfiltered liquid and conducting the filtered liquid therefrom.

27. In a filter, filter elements consisting of two filter layers of compressed pulp, the fibers of which touch each other in an annular area of contact at their periphery, but not touching the layers of the neighboring filtering elements, of means for supplying the filter elements with unfiltered liquid and conducting the filtered liquid therefrom.

28. In a filter, in combination, a plurality of filter elements, each composed of two layers of compressed pulp, the fibers of the same being interlaced in an annular area of contact at the periphery, and more compressed at their center.

29. In a filter, in combination, a plurality of filter elements, each composed of two layers of compressed pulp, the fibers of the same touching each other in an annular area of contact at the periphery, and are more compressed at their centers.

30. In a filter, the combination with a plurality of filter elements, each composed of two layers of compressed pulp, the fibers of the same being interlaced in an annular area of contact, but not interlaced with the layers of the neighboring filtering elements, of means adapted to prevent the passage, between two neighboring elements, of unfiltered liquid to the filtered side.

31. In a filter, the combination with a plurality of filter elements, each composed of two layers of compressed pulp, the fibers of the same touching each other in an annular area of contact, but not touching the layers of the neighboring elements, of means adapted to prevent the passage between two neighboring elements, of unfiltered liquid to the filtered side.

32. In a filter, the combination with a plurality of filter elements, each composed of two layers of compressed pulp, the fibers of the same being interlaced in an annular area of contact, but not interlaced with the layers of the neigboring filter elements, of non-porous means adapted to prevent the passage of unfiltered liquid between two neighboring filtering elements into the clear side.

33. In a filter, the combination with a plurality of filter elements, each composed of two layers of compressed pulp, the fibers of the same touching each other in an annular area of contact, but not touching the fibers of neighboring layers but connected with non-porous means adapted to prevent the passage of unfiltered liquid between two neighboring filtering elements into the clear side.

34. In a filter, the combination with a plurality of filter elements, each composed of two layers of compressed pulp, the fibers of the same being interlaced in an annular area of contact at their periphery but not interlaced with the layers of the neighboring filtering elements, of means adapted to prevent the passage of unfiltered liquid between two neighboring filtering elements into the clear side, and of means for supplying the filter elements with unfiltered liquid and conducting the filtered liquid therefrom.

35. In a filter, the combination with a plurality of filter elements, each composed of two layers of compressed pulp, the fibers of the same touching each other in an annular area of contact at their periphery but not touching the fibers of the neighboring filter elements, of means adapted to prevent the passage of unfiltered liquid between two neighboring filtering elements into the clear side, and of means for supplying the filter elements with unfiltered liquid and conducting the filtered liquid therefrom.

36. In a filter, a plurality of filter elements, each supplied and drained by capillary liquid-ways consisting of woven-wire cloths, means for supporting said cloths, consisting of central hubs each provided with passages connecting with both said capillary liquid-ways, and of means for supplying the inlet liquid-ways with unfiltered liquid and conducting the filtered liquid from the outlet liquid-ways.

37. In a filter, a plurality of superimposed filter elements consisting of filter layers, each supplied and drained by liquid-conductors consisting of woven-wire cloths, central hubs, each provided with projecting flanges arranged in pairs and adapted to support between them the sheets of woven-wire cloth, and of means for supplying the inlet liquid-ways with unfiltered liquid and conducting the filtered liquid from the outlet liquid-ways.

38. In a filter, a plurality of superimposed filter elements, consisting of filter layers, each supplied and drained by liquid-conductors consisting of woven cloths, central hubs, each provided with projecting flanges arranged in pairs and adapted to support between them sheets of woven cloth, each hub being provided with apertures affording communication between the said cloths so supported, and passages within the hubs.

39. In a filter, a central hub provided with horizontally-projecting flanges in pairs adapted to support between them sheets of woven-wire cloth and means affording communication between said cloth and passage within the hub of filter layers, and means for supplying the filter layers with unfiltered liquid and conducting the filtered liquid therefrom.

40. In a filter, a central hub comprising an inner annulus, flanges projecting therefrom in pairs and adapted to embrace between them sheets of woven-wire cloth, and provided with passages leading from the interior of the annulus to the spaces between the flanges, of filter layers, and means for supplying the filter layers with unfiltered liquid and conducting the filtered liquid therefrom.

41. In a filter, comprising a plurality of filter elements, each supplied and drained by capillary liquid-ways consisting of woven-wire cloths, means for supporting said cloths consisting of central hubs provided with apertures, connecting the interior thereof with both of said cloths, and provided also with smooth external surfaces whereby a close contact is secured between the filter mass and the said surfaces, and means for supplying the inlet liquid-ways with unfiltered liquid and conducting the filtered liquid from the outlet liquid-ways.

42. In a filter, a central hub consisting of an inner annulus, flanges projecting therefrom in pairs and adapted to embrace between them sheets of woven-wire cloth, and provided with passages leading from the interior of the annulus to the space between the flanges and other passages not communicating with those first named, the latter being formed within the walls of the hub, in combination with filter layers, and means for supplying the filter layers with unfiltered liquid and conducting the filtered liquid therefrom.

43. In a filter, a central hub consisting of an inner annulus, flanges projecting therefrom in pairs and adapted to embrace between them sheets of woven-wire cloth and provided with passages leading from the interior of the annulus to the spaces between the flanges and other passages not communicating with those first named, also formed within the walls of the hub and adapted to communicate with sheets of woven-wire cloth held between each pair of hubs when the latter are arranged in vertical series.

44. In a filter, the combination with central hubs, each provided with projecting flanges in pairs adapted to embrace between them sheets of woven-wire cloth, and provided with passages leading from the interior of the annulus to the space between the flanges and other passages not communicating with those first named, formed within the walls of the hub and adapted to communicate with sheets of woven-wire cloth held between each pair of hubs when the latter are arranged in vertical series, of filter layers arranged between the sheets of woven-wire cloth and means for supplying the same with liquid.

45. In a filter, a series of superimposed central hubs, each provided with an inner annulus, a pair of horizontal projecting flanges with a suitable space between them and an upwardly-projecting annular flange, in combination with filter layers, and means for supplying the filter layers with unfiltered liquid and conducting the filtered liquid therefrom.

46. In a filter, a series of superimposed central hubs, each provided with an inner annulus, a pair of horizontal projecting flanges, an upwardly-projecting annular flange and a downwardly-projecting annular flange, in combination with filter layers, and means for supplying the filter layers with unfiltered liquid and conducting the filtered liquid therefrom.

47. In a filter, a series of superimposed central hubs, each provided with an inner annulus, a pair of horizontal projecting flanges, an upwardly-projecting annular flange and a downwardly-projecting annular flange, the upwardly-projecting flange on one hub and the downwardly-projecting flange on the hub above it being adapted between them to embrace and support a sheet of woven-wire cloth, in combination with filter layers, and means for supplying the filter layers with unfiltered liquid and conducting the filtered liquid therefrom.

48. In a filter, the combination with a series of superimposed central hubs each provided with an inner annulus, horizontally-projecting, upwardly-projecting and downwardly-projecting flanges, of a woven-wire-cloth liquid-conductor embraced between and supported by the horizontal flanges and a woven-wire liquid-conductor embraced between and supported by the upwardly and downwardly projecting flanges of each pair of hubs acting together, with filter layers and means of supplying the filter layers with unfiltered liquid and conducting the filtered liquid therefrom.

49. In a filter, the combination with a series of superimposed central hubs, each provided with an inner annulus, horizontally-projecting, upwardly-projecting and downwardly-projecting flanges, of a woven-wire-cloth liquid-conductor embraced between and supported by the horizontal flanges and a woven-wire liquid-conductor embraced between and supported by the upwardly and downwardly projecting flanges of each pair of hubs acting together, and passages within the hub communicating with each of said conductors and not with each other, with filter layers, and of means for supplying the filter layers with unfiltered liquid and conducting the filtered liquid therefrom.

50. In a filter, a central hub consisting of an inner annulus, horizontal flanges projecting therefrom in pairs and upwardly and downwardly projecting annular flanges providing between their inner surfaces and the outer surfaces of the wall of the inner annulus, liquid-channels and means by which such channels communicate with each other, in combination with filter layers, and means for supplying the filter layers with unfiltered liquid and conducting the filtered liquid therefrom.

51. In a filter, a series of superimposed central hubs adapted to support filter layers and liquid-conductors placed between the latter, each hub consisting of a central inner annulus and provided with a pair of horizontal projecting flanges and upwardly and downwardly projecting annular flanges, the latter being adapted to not quite touch each other when the hubs are assembled in vertical series, in combination with filter layers, and of means for supplying the filter layers with unfiltered liquid, and conducting the filtered liquid therefrom.

52. In a filter, a series of superimposed central hubs adapted to support filter layers and conductors arranged between them, each hub consisting of an inner annulus and provided with upwardly and downwardly projecting annular flanges whereby there is constituted between the inner surfaces of such annular flanges and the outer surfaces of the wall of the inner annulus annular liquid-channels, which are provided with means for communicating with each other, consisting of a series of vertical apertures, the axis of which are parallel substantially to the vertical axis of the hub, in combination with filter layers, and of means for supplying the filter layers with unfiltered liquid and conducting the filtered liquid therefrom.

53. In a filter, the combination with a central hub, comprising an inner annulus provided with a pair of horizontal projecting flanges and radial passages between the interior of the annulus and a space between said flanges, of an outlet fluid-way consisting of woven gauze held between said flanges, filter layers arranged on each side of said outlet fluid-ways, inlet fluid-ways arranged in contact with said filter layers, and means for supplying the inlet fluid-ways with unfiltered liquid and conducting the filtered liquid from the outlet fluid-way.

54. In a filter, the combination with a central hub comprising an inner annulus provided with a pair of horizontal projecting flanges and radial passages between the interior of the annulus and the space between said flanges, of an outlet fluid-way consisting of woven gauze held between said flanges, a layer of filter mass arranged on each side of gauze and interlaced in an annular area of contact beyond the periphery thereof, inlet fluid-ways consisting of woven gauze supported by and embraced between the said hub and a similar hub and means for supplying the inlet fluid-ways with unfiltered liquid and conducting the filtered liquid from the outlet fluid-ways.

55. In a filter, the combination with a plurality of central hubs, each consisting of an inner annulus provided with a pair of horizontal projecting flanges and radial passages between the interior of the annulus and the space between the flanges, of an outlet fluid-way consisting of woven cloth held between said flanges, a layer of filter mass arranged on each side of said woven cloth, inlet fluid-ways arranged on the other sides of said filter layers and held in position by projecting flanges on neighboring hubs when the latter are arranged in vertical series, and means for supplying the inlet fluid-ways with liquid, consisting of vertical channels arranged within the walls of the hub.

56. In a filter, a central hub consisting of an inner annulus, a pair of horizontal projecting flanges, passages communicating between the interior of the annulus and the space between the flanges, and an upwardly-projecting flange, which does not reach as high as the rim of the inner annulus, in combination with filter layers, and of means for supplying the filter layers with unfiltered liquid and conducting the filtered liquid therefrom.

57. The combination with a disk-shaped filtering layer of compressed pulp, of a liquid-conductor for clear liquid, of a smooth surface outside the clear liquid-way, in intimate contact with the edge of said filter layer and parallel thereto, said smooth surface of a width at least equal to the thickness of the filter layer at the edge.

58. In a filter, the combination with a plurality of circular filter elements, each consisting of two flat fibrous filtering layers, interlaced with each other at their periphery so as to prevent unfiltered liquid from entering between said layers, and connected at their centers by rigid means affording a communicating passage for the clear liquid of all the filter elements, in combination with liquid-ways for draining off the filtered liquid and means for supplying the filter elements with unfiltered liquid.

59. In a filter, the combination of a plurality of filter elements, each consisting of a fibrous filtering medium, embedded in which is a circular disk-shaped liquid-conductor for the draining of the clear liquid, consisting of wire screen, and of means offering no greater porosity than said filtering medium, for supplying the filter elements with unfiltered liquid.

60. In a filter, in combination, a liquid-conductor consisting of coarse-wire screen and fiber-retaining screen, said liquid-conductor interposed between and in contact with two filtering layers of compressed fibrous pulp.

61. In a filter, in combination, a liquid-conductor consisting of coarse-wire screen and fiber-retaining screen, said liquid-conductor interposed between and in contact with two filtering layers of fibrous material.

62. In a filter, the combination of two filter layers of compressed pulp, of a coarse-screen liquid-conductor interposed between them and draining or supplying both of them and in direct contact with the fibers of a filter layer, with means for supplying or draining the liquid-conductors.

KARL KIEFER.

Witnesses:
  CHAS. L. RICHTER,
  EDWIN S. GOLDSTEIN.